US006005460A

United States Patent [19]

Garrigus et al.

[11] Patent Number: 6,005,460

[45] Date of Patent: Dec. 21, 1999

[54] HIGH TEMPERATURE SUPERCONDUCTOR MAGNETIC CLAMPS

[75] Inventors: Darryl F. Garrigus; Michael Strasik, both of Issaquah; Karl A. Hansen, deceased, late of Seattle; by John J. DeJong, executor, Bellevue, all of Wash.

[73] Assignee: The Boeing Company, Seattle, Wash.

[21] Appl. No.: 08/738,993

[22] Filed: Oct. 24, 1996

[51] Int. Cl.$^6$ .......... H02F 6/00

[52] U.S. Cl. .......... 335/216; 335/285; 335/295

[58] Field of Search .......... 335/216, 385, 335/295; 310/90.5; 505/211, 212, 213, 879

[56] References Cited

U.S. PATENT DOCUMENTS

| | | | |
|---|---|---|---|
| 5,012,216 | 4/1991 | Jin | 335/216 |
| 5,159,219 | 10/1992 | Chu et al. | 310/90.5 |
| 5,513,498 | 5/1996 | Ackermann et al. | 62/51.1 |
| 5,563,565 | 10/1996 | Hull | 335/216 |

OTHER PUBLICATIONS

Article; "High Magnetic Flux Trapping by Melt–Grown YBaCuO Superconductors," *Japanese Journal of Applied Physics,* vol. 30, No. 7A, pp. L 1157–L1159; Jul. 1991.

Article; "Magentic Shielding by Superconducting Y–Ba–Cu–O Prepared by the Modified Quench and Melt Growth (QMG) Process," *Japanese Journal of Physics,* vol. 31 (1992), Part 1, No. 4, pp. 1026–1032; Apr. 1992.

*Primary Examiner*—Michael L. Gellner
*Assistant Examiner*—Raymond Barrera
*Attorney, Agent, or Firm*—Christensen O'Connor Johnson & Kindness PLLC

[57] ABSTRACT

Magnetic flux trapping clamps are provided that trap or pin the magnetic flux of ring shaped superconductive magnets in a high permeability metallic core located in the bore of the ring. Preferably, the superconductive magnets comprise a single crystal cut into a ring shape. Multiples of the flux-pinned magnets, having high magnetic strength, can be arranged in a variety of arrays for a range of applications. The devices offer several advantages over permanent or electromagnets. The devices easily activated by charging with a cryogenic fluid, to induce the superconductive effect, and deactivated by draining the fluid.

16 Claims, 3 Drawing Sheets

HIGH TEMPERATURE SUPERCONDUCTOR MAGNETIC CLAMPS

FIELD OF THE INVENTION

The invention relates to improved magnetic clamps that include high temperature superconductive magnets, that incorporate magnetic flux pinning.

BACKGROUND OF THE INVENTION

Magnets have been used for a long time in a variety of applications, including the use of permanent magnets to attract and hold ferro-magnetic objects, to clamp objects and assemblies during manufacturing. In some circumstances, permanent magnets may constitute the only practical way of clamping objects in confined spaces during the manufacturing process. In addition to these permanent magnets, larger electromagnetic clamps and chucks also find extensive application in the manufacturing industries.

Both permanent magnets and electromagnets have significant limitations, although they are useful in a wide variety of applications. Electromagnets pose a hazard due to the very high currents and voltages that are required to generate magnetic fields of sufficient strength to be useful in industrial applications. Moreover, due to their bulk and necessary electrical power leads, electromagnets are frequently not well suited for use in confined areas. On the other hand, permanent magnets generally have a limited clamping force due to their low strength magnetic fields. In addition, their magnetic fields cannot be shut off, or easily redirected in a portable device. Usually, large magnetic forces are necessary to shut off a magnetic clamp of permanent magnets, by rotating the permanent magnet away from the workpiece being clamped.

SUMMARY OF THE INVENTION

The invention provides magnetic devices that incorporate "flux-pinning" also known as "flux trapping." Flux pinning occurs when magnetic flux is introduced in a superconductive material before it becomes superconducting. When the superconductor is cooled below its transition temperature, the flux lines are trapped and remain present, even when the source of magnetic flux is removed, and cannot move as long as the material remains in the superconducting state. By taking advantage of flux pinning, the invention provides unique magnetic clamps.

In one embodiment of the invention, the magnetic clamp includes a first magnetic clamp component, and a second magnetic clamp component. The first component includes a housing for containing a cryogenic fluid, such as liquid nitrogen. A crystalline, preferably single, crystal superconductor having a central bore is disposed in the housing so that when cryogenic liquid is poured into the housing, super currents are induced in the superconductor. Preferably, the superconductor is in the form of a ring and a high magnetic permeability metallic cylindrical core is inserted into the central bore of the ring. Consequently, when super currents are induced in the ring, magnetic flux lines penetrate both the superconductor ring bulk, and the high permeability cylindrical core material. Since global circulating currents in the superconductor cause magnetic domains of the cylindrical core material to align, magnetic flux concentration in the cylindrical core is greatly increased, up to the flux saturation of the core material.

The second clamp component is one that is able to interact magnetically with the magnetic field of the first clamp component so that an attractive magnetic force exists between the two components. The force should be sufficient to clamp the required objects substantially immovably between the first and second clamp components, and to maintain the lateral displacement of the two clamp components relative to each other.

The clamp devices of the invention provide many advantages. The core greatly increases the trapped (or pinned) field strength of the superconductor. Also, a magnetic flux return path is produced which allows large numbers of "superconductive tiles" to be assembled in an array to produce customized magnetic fields for a variety of applications. Furthermore, the devices of the invention can be charged in situ with a cryogenic fluid to induce superconductivity and magnetic fields, a useful feature for turning the clamping devices on. Also, the magnetic effect is readily turned off by draining the cryogenic fluid from the housing. Accordingly, the magnetic clamps of the invention have significant advantages over permanent or electromagnets.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

The invention provides unique clamps, that include a superconductive magnet that have a trapped magnetic flux. In particular, flux-pinning is produced by inserting a preferably high relative magnetic permeability core into the central throughbore of the superconductive magnet, that is preferably in the form of a ring. Thus, when super currents are induced in the superconductive composition through cooling with a cryogenic liquid, the magnetic flux is trapped or pinned. Preferably, the ring of superconductive material that comprises the superconductor ring is formed of a single crystal, although multi-crystalline compositions are also useful. The high permeability core preferably has a permeability in the range $10^2$–$10^6$, preferably greater than about 100 and more preferably greater than about 800.

Clearly, the concept of flux-pinning of the invention can be used to provide a variety of magnetic clamps. The following figures illustrate embodiments of certain clamps in accordance with the invention, with the understanding that the figures do not limit the scope of the invention and are merely provided for illustrative purposes to enhance an understanding of the invention.

Figure 1A:
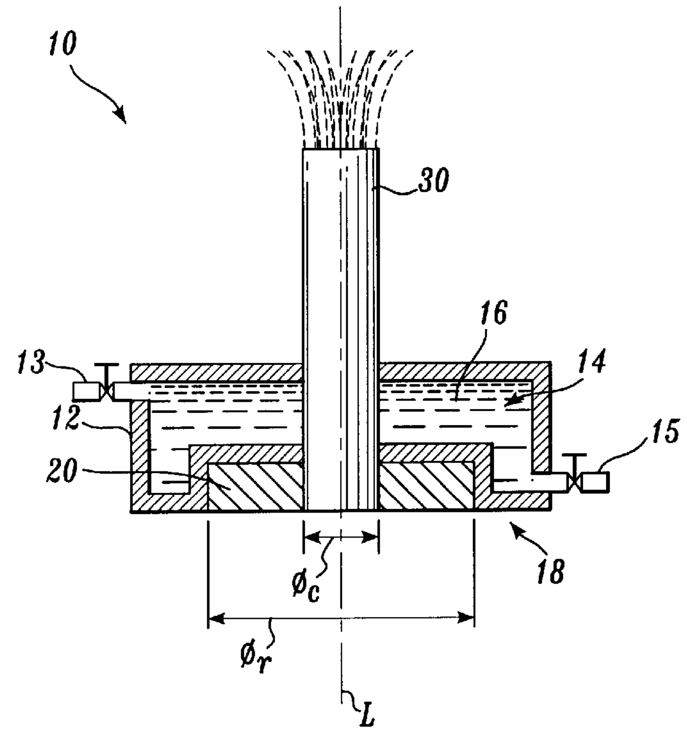
FIG. 1A is a schematic cross-sectional view of a single flux-trapped superconductive magnet in accordance with the invention.

FIG. 1 is a schematic cross-sectional view of an embodiment of a flux-pinned superconductive magnet device 10. The exemplified device includes a cylindrical housing 12 having an internal space 14 that is filled with a cryogenic fluid 16, as illustrated. In the embodiment shown, the device 10 has a longitudinal axis of symmetry L. A ring 20 of crystalline superconductive material is disposed in a cylindrical cavity of face 18 of the housing 12 so that the center of the ring coincides with the axis of symmetry L. The ring 20 has an outer diameter $\phi_r$. As shown, a high permeability magnetic cylinder 30 of diameter $\phi_c$ extends from the central bore of the ring 20, through the housing 12, through an opposite circular face of the housing, with its longitudinal axis coincident with the axis of symmetry L of the magnetic device 10. The cylinder's diameter $\phi_c$ approximates the diameter of the bore of the ring 20 so that the cylinder fits snugly into the bore. In certain embodiments, the core 30 does not extend outward beyond the thickness of the ring 20.

The housing 12 shown in FIG. 1 is equipped with an inlet 13 for supplying the cryogenic fluid 16 to the interior space 14 so that heat may be removed from the superconductive composition of the ring 20, and an outlet 15 for draining fluid. Preferably, valves or some other fluid control devices are included in the inlet and/or outlet to control the supplying of cryogenic fluid to and the removal of cryogenic fluid from the interior space 14. When sufficient heat is removed, the temperature of the superconductive ring 20 drops to below the critical temperature at which super currents are induced in the ring. At this point, the ring 20 becomes a magnetic superconductor. If the high permeability core 30 is in place in the central bore of the ring, then the magnetic flux of the device is pinned. If it is displaced, the device will return to an initial displacement relative to another magnetic component, and it will resist displacement by displaying a magnetic inertia. According to Lenz's law, the magnetic field of a current generated as a result of the passing of a first magnetic field through a conductor is in direct opposition to the polarity of the first magnetic field. Consequently, with a superconductor that has a zero electrical resistance, the generated magnetic field is exactly equal and opposite to the magnetic field that generated it.

Preferably the ratio of ring diameter $\phi_r$ to core diameter $\phi_c$ is selected so that the ring circular-face surface area $\pi(\phi_r^2-\phi_c^2)/4$, is equal to or greater than the core cross-sectional surface area: $\pi\phi_c^2/4$. In the case where a ring and core are of the same length, and the core flux density is operating at or near saturation, then the ring area must be sufficient to act as a flux return path for both the flux of the core and the flux pinned in the ring.

Figure 1B:
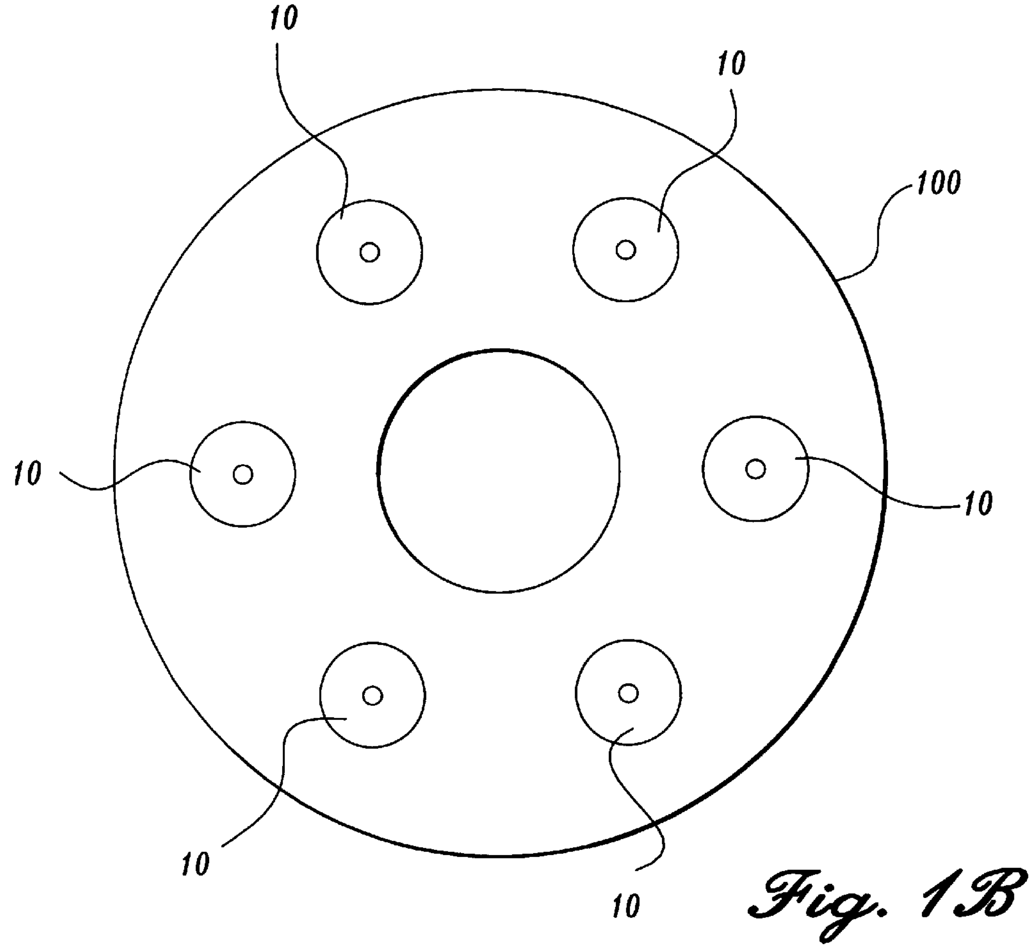
FIG. 1B is an embodiment of the invention showing a ring with "tiles" of superconductive flux-pinning magnets arranged thereon in a circular array.

As shown in FIG. 1B, a plurality of magnetic devices 10 ("tiles") of the invention may be arranged in a pattern, such as the circular array of device 100 shown in FIG. 1B. Devices of this type may be used as one component of a bearing or clamp, in accordance with the invention. In FIG. 1B, the tiles 10 are embedded in cylindrical cavities in the high magnetic permeability ring 110 to form device 100.

Figure 2A:
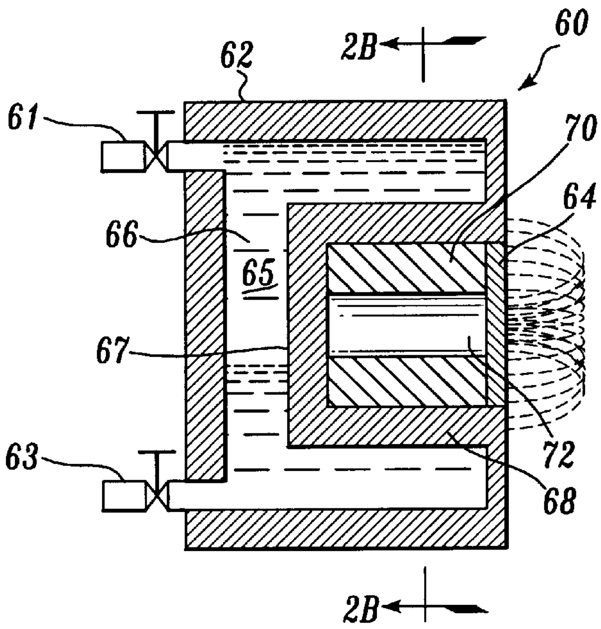
FIG. 2A is a schematic side cross-sectional view of another embodiment of a flux-pinned high temperature superconductor magnet device, in accordance with the invention.
Figure 2B:
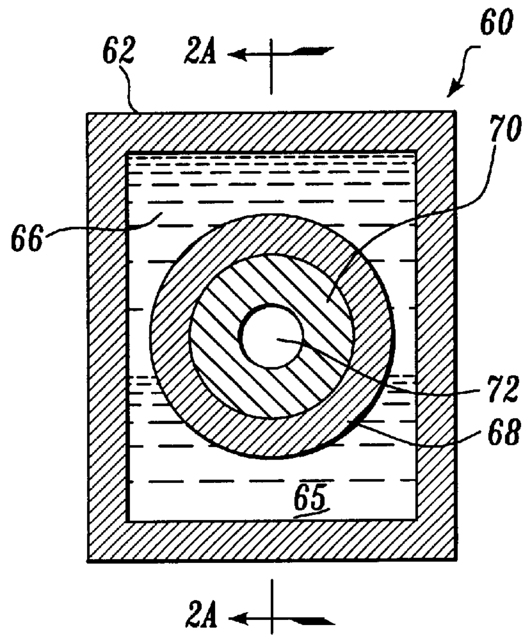
FIG. 2B is a top view, in cross section, of the device of FIG. 2A.

An exemplary embodiment of the magnetic clamps of the invention is shown in simplified, schematic side cross-sectional view in FIG. 2A, and plan cross-sectional view in FIG. 2B. The clamp component 60 has a housing 62, in this particular instance a rectangular housing, with an interior space 65 for receiving and containing a cryogenic fluid 66. As with FIG. 1, the cryogenic fluid 66 is supplied via an inlet 61 and removed via an outlet 63. One face of the housing 62 has a cylindrical cavity 68, sized to receive a superconductive ring 70 with a high permeability magnetic core 72 in a central throughbore of the ring. A lid 64 is placed over the cavity of the housing, to contain the ring 70 and core 72 in the cavity, and to produce a coextensive planar outer surface. Clearly, as shown in FIG. 1B, more than one ring may be used in a clamp device.

Figure 3:
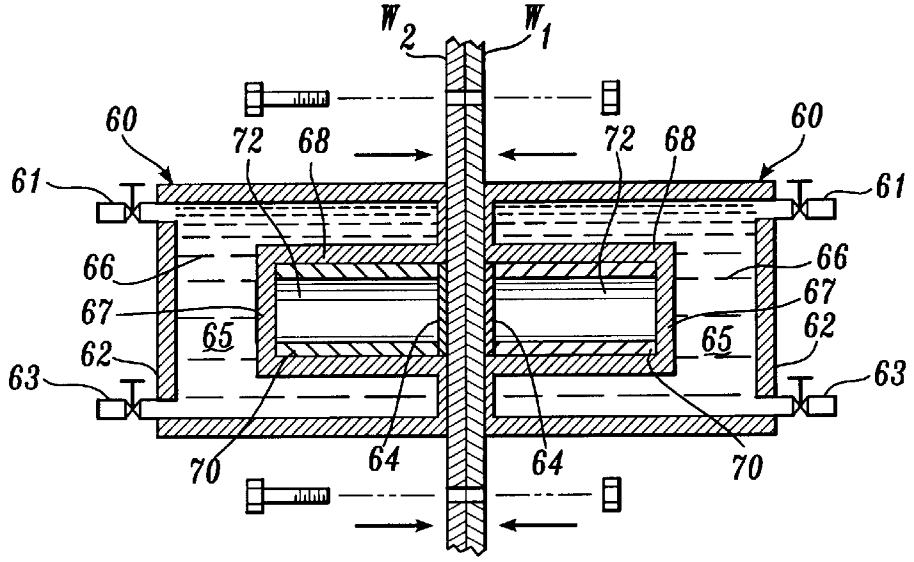
FIG. 3 is a schematic illustration inside cross-sectional view of an embodiment of a magnetic clamp in accordance with the invention.
Figure 4:
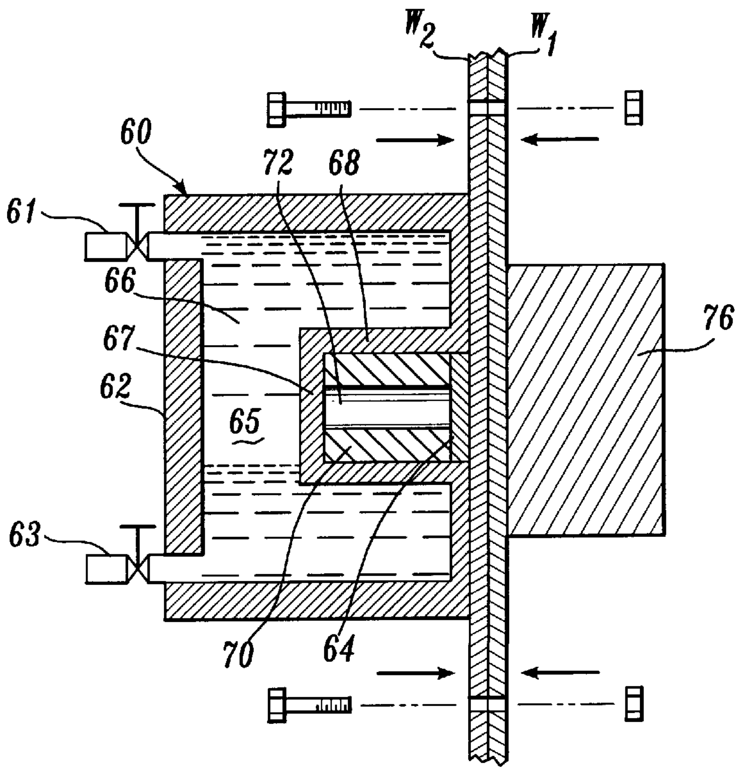
FIG. 4 is a side cross-sectional view of another embodiment of a magnetic clamp in accordance with the invention.

FIGS. 3 and 4 illustrate how embodiments of the magnetic clamps of the invention may be used to clamp together workpieces so that they may be more permanently fastened together, by other methods. Referring to FIG. 3, a schematic simplified cross-sectional side view, two magnetic devices 60 are applied, one on each side of two workpieces W1, W2. Ordinarily, the superconductive magnetic clamps components 60 are activated by supplying cryogenic fluid to their interior spaces 65. Further, the workpieces W1 and W2 are released from clamping force by draining cryogenic fluid from the clamp component 60. Thus, the clamps can be used in a wide variety of applications, and even in restricted manufacturing spaces where the use of electromagnets may not be practical.

Moreover, as illustrated in FIG. 4, only one clamp component 60 need be of the superconductive magnetic type, described above. The other component 76 may comprise a magnet selected from permanent magnets, electromagnets, rare earth magnets, and the like, or another superconductive magnet.

In accordance with a method of the invention, workpieces may be clamped together by placing a magnetic component of the invention on at least one side of a workpiece, inducing supercurrents in the superconductive ring component of the magnetic clamp to induce a magnetic field, and pinning the field within the high permeability core of the magnet. The pinned magnet field generated interacts with either a superconductive magnet, or an electromagnet, or a permanent magnet, placed on the other side of the object(s) being clamped. Because the field is pinned, lateral movement of one clamp component relative to the other is resisted, as explained above. To release the clamping force, cryogenic fluid is drained from the superconductive magnetic clamp component of the invention so that the temperature of the superconductive ring rises to above superconducting temperature, and supercurrents cease.

While the preferred embodiments of the invention has been illustrated and described, it will be apparent that various changes can be made therein without departing from the spirit and scope of the invention.

The embodiments of the invention in which an exclusive property or privilege is claimed are defined as follows:

1. A magnetic clamp comprising:

(a) a first magnetic clamp component for producing a magnetic field suitable for creating an attractive magnetic force when interacting with the magnetic field produced by a second magnetic clamp component, said first magnetic clamp component comprising:

(i) a housing having an internal space suitable for receiving a cryogenic fluid;

(ii) a control system for supplying cryogenic fluid to and removing cryogenic fluid from said internal space in said housing;

(iii) a crystalline superconductor having a central bore, said crystalline superconductor mounted in said housing so as to be in heat transmission relationship with cryogenic fluid located in said internal space in said housing; and (iv) a high magnetic permeability metallic core located in the central bore of said crystalline superconductor, said high magnetic permeability metallic core concentrating the flux of the magnetic field produced by said crystalline superconductor when current is induced in said crystalline superconductor; and (b) a second magnetic clamp component aligned with said first magnetic clamp component, the second magnetic clamp component producing a magnetic field capable of interacting with the magnetic field produced by the first magnetic clamp component to create an attractive magnetic clamping force between the first and second magnetic clamp components.

2. The clamp of claim 1, wherein said crystalline superconductor is comprised of a single superconductive crystal.

3. The clamp of claim 1, wherein the high magnetic permeability metallic core comprises a metal having a magnetic permeability greater than about $10^2$.

4. The clamp of claim 1, wherein the second magnetic clamp component comprises a rare earth magnet.

5. The clamp of claim 1, wherein the second magnetic clamp component is selected from the group of magnets consisting of electromagnets and permanent magnets.

6. The clamp of claim 1, wherein said control system for supplying cryogenic fluid to and removing cryogenic fluid from said internal space in said housing comprises inlet and outlet valves.

7. The clamp of claim 1, wherein the housing has a cylindrical cavity, and wherein said crystalline superconductor is cylindrical and at least partially contained in the cylindrical cavity.

8. The clamp of claim 7, wherein the surface area of a circular face of said cylindrical crystalline superconductor is substantially equal to the surface area of an end of said high magnetic permeability metallic core.

9. The clamp of claim 7, wherein:

(a) said crystalline superconductor is in the form of a ring;

(b) said central bore in said crystalline superconductor and said high magnetic permeability magnetic core are cylindrical; and (c) the surface area of a circular face of the ring, calculated by the formula $\pi(\phi_r^2-\phi_c^2)/4$, relates to the cross-sectional area of the core ($\pi\phi_c^2/4$) by the formula:

$$\pi(\phi_r^2-\phi_c^2)/4 \geqq \pi\phi_c^2/4$$

where $\phi_r$ is the diameter of the superconductor ring; and $\phi_c$ is the diameter of the bore in the superconductor ring and the diameter of the high magnetic permeability metallic core.

10. The clamp of claim 1, wherein said second magnetic clamp component comprises:

(a) a housing having an internal space suitable for receiving a cryogenic fluid;

(b) a control system for supplying cryogenic fluid to and removing cryogenic fluid from said internal space in said housing;

(c) a crystalline superconductor having a central bore, said crystalline superconductor mounted in said housing so as to be in heat transmission relationship with cryogenic fluid located in said internal space in said housing; and (d) a high magnetic permeability metallic core located in the central bore of said crystalline superconductor, the high magnetic permeability metallic core concentrating the flux of the magnetic field produced by said crystalline superconductor when current is induced in said crystalline superconductor.

11. The clamp of claim 10, wherein said control system for supplying cryogenic fluid to and removing cryogenic fluid from said internal space in said housings of said first and second magnetic clamp components comprises inlet and outlet valves.

12. The clamp of claim 10, wherein said crystalline superconductors included in said first and second magnetic clamp components comprise single superconductive crystals.

13. The clamp of claim 10, wherein the high magnetic permeability metallic cores included in said first and second magnetic clamp components have a magnetic permeability greater than about $10^2$.

14. The clamp of claim 10, wherein the housings of said first and second magnetic clamp components have a cylindrical cavity and wherein said crystalline superconductors included in said first and second magnetic clamp components are cylindrical and at least partially contained in the cavity in their respective housings.

15. The clamp of claim 14, wherein the surface area of a circular face of the cylindrical crystalline superconductors included in said first and second magnetic clamp components are substantially equal to the surface area of the end of the high magnetic permeability magnetic cores included in said first and second magnetic clamp components.

16. The clamp of claim 14, wherein:

(a) said crystalline superconductors included in said first and second magnetic clamps are in the form of a ring;

(b) said central bore in said crystalline superconductors and said high magnetic permeability magnetic cores included in said first and second magnetic clamps are cylindrical; and (c) the surface area of a circular face of said rings, calculated by the formula $\pi(\phi_r^2-\phi_c^2)/4$, relates to the cross-sectional area of the core ($\pi\phi_c^2/4$) by the formula:

$$\pi(\phi_r^2-\phi_c^2)/4 \geqq \pi\phi_c^2/4$$

where: $\phi_r$ is the diameter of the superconductor ring; and $\phi_c$ is the diameter of the bore in the superconductor ring and the diameter of the high magnetic permeability metallic core.

* * * * *

UNITED STATES PATENT AND TRADEMARK OFFICE

CERTIFICATE OF CORRECTION

PATENT NO. : 6,005,460

DATED : December 21, 1999

INVENTOR(S) : D. Garrigus *et al.*

It is certified that error appears in the above-identified patent and that said Letters Patent is hereby corrected as shown below:

At column 1, line 3, please insert:

-- NOTICE OF GOVERNMENT RIGHTS

-- This invention was made with Government support under Contract F49620-90-C-0079 awarded by the Air Force. The Government has certain rights in this invention. --

Signed and Sealed this

Twelfth Day of September, 2000

*Attest:*

Q. TODD DICKINSON

*Attesting Officer*

*Director of Patents and Trademarks*